Aug. 27, 1957 W. E. ASKEY 2,804,426
MAINTAINING CATALYST ACTIVITY IN A HYDROFORMING PROCESS
Filed May 27, 1954 2 Sheets-Sheet 1

INVENTOR.
Warren E. Askey,
BY
ATTORNEY.

United States Patent Office 2,804,426
Patented Aug. 27, 1957

2,804,426

MAINTAINING CATALYST ACTIVITY IN A HYDROFORMING PROCESS

Warren E. Askey, Baytown, Tex., assignor, by mesne assignments, to Esso Research and Engineering Company, Elizabeth, N. J., a corporation of Delaware Application May 27, 1954, Serial No. 432,739

2 Claims. (Cl. 196—50)

This invention is directed to an improvement in process for the conversion of organic compounds by contact with solid catalyst particles comprising high surface area alumina as catalytic or supporting component. The invention is not applicable to those processes employing a catalyst in which alumina is combined with more than about 5% of silica.

More specifically, the present invention is directed to an improvement in conversion processes employing a catalyst comprising high surface area alumina (hereinafter called gamma alumina), in which the catalyst is occasionally exposed to very high temperatures, and more particularly to regenerative hydrocarbon conversion processes such as hydroforming in which the catalyst is periodically regenerated by burning.

The present invention is particularly suited to regenerative hydrocarbon conversion processes in which a catalyst comprising gamma alumina is employed in pilled form in a fixed catalyst bed.

Specifically, the invention is an improvement in a process for the conversion of organic compounds using a contact mass of solid catalyst particles which consist of gamma alumina, no more than about 5% by weight, based on said alumina, of silica and no more than 25% by weight, based on said alumina, of a catalytic metal, metal oxide, or metal salt, and especially of molybdenum oxide, in which process some of the catalyst particles may be exposed to conditions of sufficiently high temperature for a sufficient time to convert gamma alumina to alpha alumina so that a portion of the catalyst particles becomes relatively less catalytically active than another portion. The process is improved, according to this invention, by continuously or intermittently removing a portion of the total contact mass, separating the contact mass into a fraction of catalyst particles having a relatively high particle density and a fraction having a relatively low particle density by use of a classifying means, and returning the higher particle density fraction, which is more catalytically active, to the reaction zone for further contact with fresh feed.

A preferred embodiment of the invention will now be described wherein—

Figure 1:
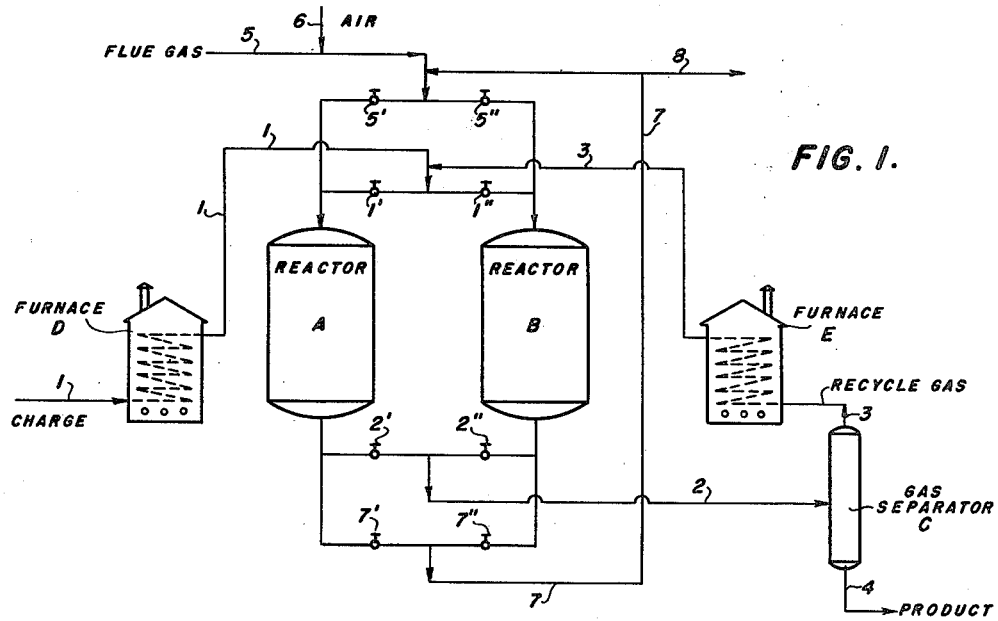
Fig. 1 is a diagrammatic flow plan of a system suitable for carrying out the catalytic conversion of hydrocarbons and regeneration of catalyst.

Turning now to Fig. 1, this figure shows a system suitable for carrying out a fixed bed, regenerative catalytic reforming reaction, usually known as hydroforming. The essential items of equipment shown are reactors A and B, gas separator C, charge furnace D, and recycle gas furnace E, and suitable piping connections and valves. It will be realized that numerous essential items of equipment such as pumps, gas compressors, flue gas generator, heat exchangers, valves, and the like are not shown for the purpose of simplification of the diagram. With a two-reactor system as shown, one reactor may be on stream while the other is being regenerated.

Assuming now that reactor A is on stream and reactor B is being regenerated, the flow will be as follows: A suitable charge naphtha, such as a naphthenic straight run fraction boiling from 200° to 330° F., is charged through line 1, and heated in furnace D. Hydrogen-rich gas is added through line 3, and the mixture passes into reactor A through the line controlled by valve 1', which is open, valve 1" being closed. In reactor A the charge is converted by contact with a catalyst. The catalyst and reaction conditions will be described below. The converted product stream leaves the reactor through the line controlled by valve 2', which is open, valve 2" being closed, and is conducted through product line 2 to gas separator C where it is separated into a liquid product, which is removed through line 4 for further treatment and separation into suitable fractions, and a gas stream which is rich in hydrogen and some light hydrocarbons and which may be recycled through line 3 and furnace E for return to the reactor.

While reactor A is on stream, reactor B is regenerated as follows: Hot flue gas, from a source not shown, enters the system through line 5, is admixed with a suitable amount of air through line 6 and is passed to reactor B through the line controlled by open valve 5", valve 5' being closed. The oxygen-containing flue gas regenerates the catalyst in reactor B by burning carbonaceous residue therefrom and the spent flue gas leaves reactor B through the line controlled by open valve 7", valve 7' being closed, and through line 7 is recycled to line 5. Part of the flue gas may be removed from the system through line 8.

After reactor A has been on stream for a sufficient time to have carbonaceous material deposited on the catalyst, thus decreasing catalyst activity, the flow of charge through reactor A and flow of flue gas through reactor B are discontinued. Hydrocarbon material is purged from reactor A and oxygen-containing gas from reactor B. The flow is then reversed so that charge flows through reactor B while regenerating gas flows through reactor A. In this case, valves 1', 2', 5" and 7" are closed, and valves 1", 2", 5' and 7' are open.

For description, in greater detail, of a system similar to that above described reference may be had to U. S. Patent 2,547,221 to Layng.

In operating according to the present invention, the catalyst employed in the above-described hydroforming operation consists originally of particles containing from 1 to 25% of a catalytic metal, metal oxide, or metal salt supported on gamma alumina containing no more than about 5% of silica. As catalytic components, the oxides of the metals of the left hand column of group VI of the periodic table, particularly chromium, molybdenum, and tungsten are preferred, molybdenum being especially suited. Instead of the oxides, the sulfides of some of these metals may also be suitable catalysts. A preferred hydroforming catalyst contains from 5 to 15% of molybdena, supported on gamma alumina. The noble metals such as platinum and palladium may also be suitably employed as catalytic components in hydroforming.

In the operation described above, the contact mass is arranged in each reactor as a fixed bed of catalyst particles. These particles may vary in average diameter from ⅛ to ½ inch and may be irregularly shaped or may be in the form of catalyst pills. Catalyst pills of a single size in the range stated are preferred.

In the hydroforming process described above, the reaction pressure may be within the range of from about 30 to about 450 pounds per square inch, preferably between 50 and 375 pounds per square inch. Hydrogen is added with the naphtha feed in an amount ranging from 0.5 mol to 8 mols of hydrogen per mol of naphtha charge, for example, 3 mols. The liquid space velocity may vary in the range between 0.1 and 25 volumes of charge per volume of catalyst per hour.

In the above described hydroforming operation, the average reaction temperature may range from 875° to 1075° F. For example, a temperature of about 975° F. is suitable. Since the hydroforming reaction is endothermic and the reactor shown above is adiabatic, feed will have to be heated to a temperature above the average reaction temperature and will leave the reactor at a temperature below the average reaction temperature. Thus, during the reaction part of the cycle, the catalyst near the feed inlet is exposed to more severe reaction conditions and exposed to more severe deposition of carbonaceous deposits than is the catalyst near the product exit.

When the catalyst in the hydroforming process consists of molybdena supported on alumina, the time that the catalyst remains on stream before requiring regeneration may vary from less than 1 hour to 24 hours. After such time on stream, the hydrocarbon flow is discontinued, the reactor may be depressed by connecting it to a blowdown system, the reactor is then purged by means of oxygen-free flue gas for a sufficient period of time to remove all hydrocarbons, and the contact mass is then regenerated by means of a flue gas containing a controlled amount of oxygen, usually added in the form of air. For example, the gas may contain up to 2 or 3% of oxygen. The regeneration gas entering the reactor at the start of the regeneration period is at a temperature sufficiently high to maintain the combustion of carbonaceous deposits and is of sufficiently low oxygen content to avoid extremely high bed temperatures, that is, temperatures in excess of about 1100° F. For example, the gas may enter the catalyst bed at a temperature in the range of 600° to 900° F. As the regeneration progresses, a so-called flame front passes through the reactor. As the carbon is first burned off the catalyst nearest the point where the flue gas enters, the bed temperature in that region may reach up to 1100° F. but is desirably maintained at a value no higher than 1100° F. Gradually the carbonaceous material is removed from the catalyst nearest the regeneration gas inlet and the bed temperature at that point drops to the temperature of the regeneration gas, while the bed temperature at a point further away reaches its peak. When the catalyst has been completely regenerated, the oxygen is cut out of the regeneration gas and the catalyst is purged with oxygen-free flue gas and may then be returned to on-stream conditions. It may be preferable, in regenerating a reactor, to admit the regeneration gas from one end, say the top of the reactor, during half the regeneration cycle, and from the opposite end of the reactor during the remainder of the cycle. It may also be desirable to maintain different levels of temperature during different stages of the regeneration.

It is not always possible in a fixed bed reactor of the type described to maintain absolutely even flow of reactant or regenerating gases throughout the cycle of operation. In such cases it may occur, due to uneven flow or for other reasons, that a small portion of the catalyst bed becomes much more highly carbonized than the remainder. During the regeneration of such a bed, the portion having a very high carbon content will reach a substantially higher temperature than the remainder of the bed and a so-called "hot spot" may be developed. Temperatures ranging up to 1500° to 2000° F. may occur in such locations. Under these conditions, the gamma alumina base of the catalyst is converted to alpha alumina. Other undesirable effects having the tendency to decrease catalyst activity may also occur under these conditions. The catalyst particles containing the catalytic component on alpha alumina are substantially less reactive in the hydroforming reaction than those containing gamma alumina. Since the conversion from gamma to alpha alumina itself is exothermic, this may cause a further increase of the temperature in the hot spot zone.

It has been observed in commercial operations that, after approximately 6 to 9 months' operation of a hydroformer in the manner described above, the average catalyst activity has declined to the point where it is economical to remove all the catalyst and replace it with a fresh and highly active catalyst. Since the catalyst contains relatively rare and expensive metals, such as for example molybdenum or platinum, it has been the practice to recover regenerated catalyst from the commercial reactors and ship the total catalyst back to the manufacturer as spent catalyst for reworking. Such reworking may involve dissolving the valuable metal from the base, discarding the base, and producing fresh catalyst from the metal.

It has now been found that there can be recovered, from a contact mass having lost sufficient catalytic activity on the average to be no longer commercially useful, a large fraction of catalyst particles which have an activity substantially equivalent to that of fresh catalyst, while discarding for return and reworking a fraction having a very much lowered activity, apparently due to the gamma alumina therein having been converted to alpha alumina. In accordance with the present invention the active fraction is recovered by making a separation according to particle density and separating a fraction having a relatively high particle density, preferably at least equal to that of fresh catalyst, for further use on the reactors.

In operating according to the invention, a reactor system such as shown in Fig. 1 is shut down after all the reactors in the system have been regenerated. The reactor is then opened and all the catalyst is removed therefrom, for example, by dropping it into trucks or gondola cars or by shoveling it into such vehicles or by dropping it onto a conveyor. The spent catalyst mass is then separated into an active and inactive fraction by means of equipment such as shown in Fig. 2.

Figure 2:
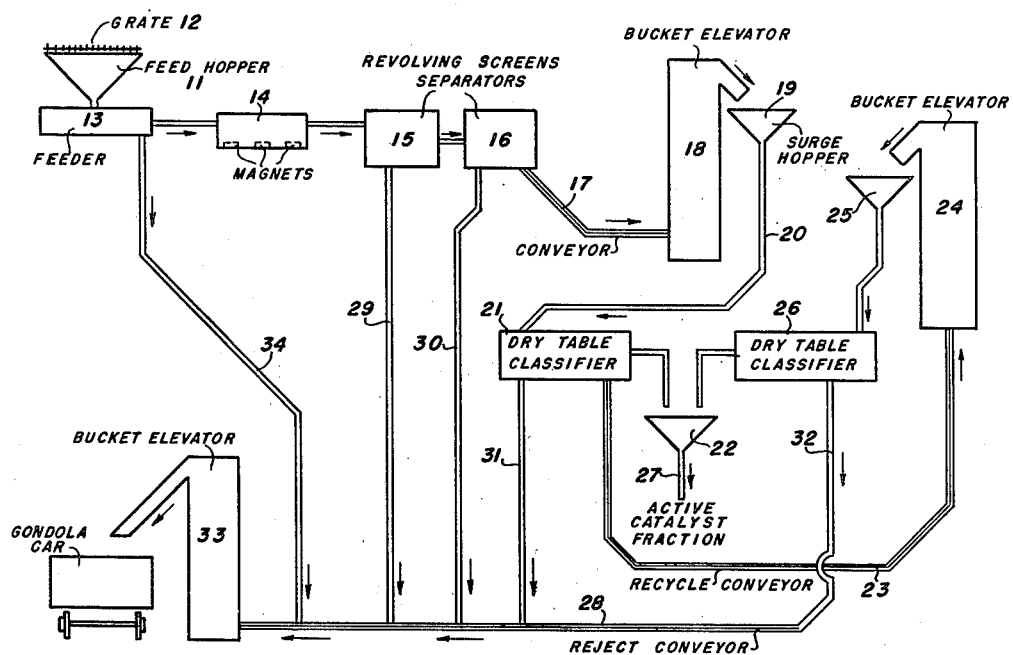
Fig. 2 is a diagrammatic flow plan of a system suitable for separating spent pilled catalyst particles into a fraction of high particle density and a fraction of low particle density.

Fig. 2 is a diagrammatic flow sheet of a system suitable for separating into active and inactive fraction a hydroforming catalyst of molybdena supported on alumina in the form of pills. The flow sheet shows how the individual pieces of equipment are integrated to allow automatic catalyst separation. It will be seen that a classification by dimension is first made to eliminate non-reusable catalyst consisting of broken pills, dust, agglomerates, and pills reduced in size by wear. This classification by dimension also serves to eliminate foreign objects such as nails, welding rods, wood chips, bolts, insulating bricks and rags. Subsequent to the size classification, a classification by particle density is made to eliminate catalyst pills that meet the size specifications but which are not suitable for reuse because of reduced activity due to conversion of the gamma alumina to alpha alumina.

Describing now the separation system of Fig. 2 in greater detail, catalyst to be processed is loaded into an elevated feed hopper 11 covered with a bar grate 12. An electronically controlled screening feeder 13 passes catalyst through magnetic separators 14 and to the first set of revolving screens 15. In order to simplify the drawing, the details of construction of set 15 of revolving screens are not shown. It is preferred that the set 15 consists of three revolving screens mounted in parallel with the screens having holes sized to permit material smaller than the desired catalyst particles to drop out. The catalyst particles of the size of original catalyst and any larger particles pass from set 15 of the revolving screens to a second set 16 of revolving screens. It is preferred that the set of screens 16 consists of three revolving screens arranged in parallel, the screens having round hole openings sized to pass only good catalyst. A product conveyor 17 and bucket elevator 18 carry the catalyst to a surge hopper 19 equipped with high and low level controls not shown. Catalyst is fed through line 20 to a dry table classifier 21, which is started and stopped by the surge hopper level controls not shown. Active catalyst is collected in product hopper 22, while conveyor 23 carries a middling product, part good and part bad, from classifier 21 to a second bucket elevator 24. This elevator charges a second surge hopper 25 equipped with high and low level controls not shown, which feeds a second dry table classifier 26 that is started and stopped by said surge hopper level controls. Active catalyst is collected in product hopper 22 and returned for further use in the conversion reaction through line 27.

Material not suitable for further use as catalyst is rejected from the product stream in the following order: (1) large foreign objects, relatively few in number, are collected by bar grate 2 on feed hopper 1 and are disposed of manually as necessary; (2) foreign objects large enough to stop flow through the revolving screens but small enough to pass the bar grate are collected by the screen of the feeder and are rejected automatically to reject conveyor 28 through line 34; (3) small metallic objects that might damage the revolving screens are separated from the catalyst stream by permanent magnets 14, which are manually cleaned at regular intervals; (4) all material smaller than acceptable passes through the slots of the first set of revolving screens 15 and falls into the reject conveyor 28 through line 29; (5) all remaining material larger than acceptable is retained on the screen of the second set of revolving screens 16 and is conveyed by the revolving motion to the screen's end where it drops into the reject conveyor 28 through line 30; (6) rejects from dry table classifiers 21 and 26 fall into reject conveyor 28 through lines 31 and 32, respectively; (7) reject conveyor 28 moves all rejects to a bucket elevator 33 where they are lifted and allowed to drop through a swinging chute into a gondola car.

A further feature of the catalyst separation plant is its dust collecting system, not shown in Fig. 2. This system consists of a blower, a cyclone separator and ducts that permit pulling catalyst dust from each piece of the totally enclosed equipment. The tumbling caused by the revolving screens and the rapid flow of catalyst through the various chutes tend to release dust from the pills and allow it to be drawn through the blower and discharged to the cyclone separator where it is collected. Dust collected in the separator drops into the reject conveyor.

The dry table classifiers 21 and 26 are probably the most important items of equipment in the plant. For reference to such equipment, note "Chemical Engineering Handbook," J. H. Perry, editor, 3rd edition, McGraw-Hill Book Company, 1950, page 1079. The catalyst particles to be classified by weight are caused to flow across the surface of a reciprocating deck which is covered with a porous cover through which air is blown. The particles are floated and stratified by air, the heavier particles settling and the lighter particles rising to the top of the bed. The motion of the deck, the volume of the air, the speed of deck oscillation and the slope of the deck all combine to cause the heavier catalyst particles to settle and travel further along the deck than the lighter ones. The heavier catalyst particles are conveyed along the deck in the direction of its motion and are discharged at its high end while the lighter particles are floated by the air and travel more or less across the line of motion of the deck and are discharged at its low end. There is a middling product discharged between the high and low ends of the deck of separator 21 and a second separator 26 has been provided to make additional separation of this material. The middling product from separator 26 can be either recycled or rejected. Cutting fingers on the edge of the separator deck may be adjusted to control qualities of product, reject and recycled catalyst.

Air blown through the separator decks not only floats the catalyst, but it blows from the pills almost all of the dust that may remain at this stage. Hoods, not shown, are connected to the dust collecting system to handle this dust.

The feed rate to the screening equipment is adjusted by means of the electronically controlled screening feeder 13. Flow between items of equipment is by gravity wherever practicable.

Control of the final quality of the product catalyst is obtained by sampling recovered material and measuring its bulk density. Changes in catalyst quality are made possible by shifting location of the cutting fingers on the discharge edge of the gravity tables. If a higher quality product is desired, the cutting fingers are shifted toward the heavy end, or if a lower quality product is desired, the cutting fingers are shifted to the light end of the gravity table. It has been found that the separation obtained from the first stage gravity table is much better than that which can be obtained from the second stage, making it necessary to operate the first stage to yield a product of higher density than the second stage in order to produce the desired quality on the combined product. Fractions of catalyst product ranging less than three pounds per cubic foot in bulk density are obtainable. The difference in bulk density between product catalyst and rejects is normally in the order of ten pounds per cubic foot.

The active fraction of catalyst is recovered from line 27 and returned to the reactor admixed with sufficient fresh catalyst to place the required total amount of catalyst in the reactor and the reactor is then returned to the hydroforming operation.

It has been stated heretofore that the active catalysts suitable for use in the present invention originally comprise a high surface area alumina which is referred to herein as "gamma alumina." High surface area alumina is well known to the trade, sometimes as "activated alumina" or "sorptive" alumina. The terminology of identifying alumina types is not entirely consistent. Generally, the alumina prepared by careful dehydration of alpha alumina monohydrate, alpha alumina trihydrate and the like, is designated gamma alumina. It is characterized by high surface area, a finite water content less than the corresponding monohydrate, and an amorphous or small crystalline structure. It is not known to occur in nature. On heating at a sufficiently high temperature for a sufficient length of time, gamma alumina is converted to the alpha form. Alpha alumina is that form of alumina which is thermodynamically stable and which is not converted to another form on further heating. When obtained by heating gamma alumina, it is generally characterized by a low surface area.

It is known that the density of alpha alumina is greater than the density of gamma alumina. Literature values for the density (in grams per milliliter) of typical alpha and gamma alumina are 3.97 and 3.2, respectively, the latter being reported as having been estimated.

Consider now a catalyst particle consisting of pure gamma alumina. The alumina in this particle will have a density of approximately 3.2 g./ml. This is the density of the solid content of the particle. However, the total volume of the particle encloses, in addition to the solid gamma alumina, a substantial amount of void space. It is this void space which provides the large surface area and the catalytic activity of the particle. When this particle is heated at 1600° F. for 10 hours, the gamma alumina in the particle will be substantially converted to alpha alumina, which has a density of 3.97 g./ml. At the same time the surface area is largely decreased and thus the number of pore spaces is reduced. The density of the solid material within the volume of the particle, which may be called its "skeletal density," has been increased by going from the active to the inactive state. At the same time, however, that this change is taking place, the total particle appears to be subjected to a slight "popcorn" effect, that is the bulk of the particle becomes slightly larger and the "particle density" is thus actually decreased. The "particle density" may be defined as the mass of a single catalyst particle divided by its volume, the volume being based on the outside dimensions of the particle and thus including all the void spaces in the particles, rather than being the volume of the solid material alone in said particle. For particles which pack substantially uniformly, the particle density correlates quite exactly with the so-called "bulk density," which is the mass of a well packed amount of particles per unit volume. Bulk density is usually the preferred unit of measurement because of convenience of determination, and may be measured in the units of pounds per cubic foot.

The fresh and very active gamma alumina base catalyst may have a surface area in the range from 90 to 300 square meters per gram when measured by adsorption of nitrogen at liquid nitrogen temperatures. In a molybdena-on-alumina hydroforming catalyst, for example, the relationship between surface area and activity is such that there is no noticeable change in activity as long as the average surface area of a total contact mass is above 80 square meters per gram. However, the activity decreases sharply below 70 square meters per gram so that at a value of 60, the catalyst retains only 95% of its initial activity and at a value of 50, it is only 85% as active as fresh catalyst. The activity level where economic factors dictate replacement of the catalyst is represented by an average surface area of 70 square meters per gram. In commercial experience, deactivation of the average catalyst mass to this level is equivalent to an average catalyst life of 11 months.

It has been stated above that the principal reason for catalyst deactivation appears to be overheating of the catalyst. This is supported by the following data obtained with molybdena-on-alumina catalyst:

*Table I*

| Time at Temp., Hrs. | Catalyst Surface Area, Sq. Meters/Gram | | |
|---|---|---|---|
| | 1,200° F. | 1,400° F. | 1,600° F. |
| 0 | 140 | 140 | 140 |
| 6 | 140 | 129 | 38 |
| 10 | 139 | 124 | 23 |

It is apparent from the data in Table I that temperatures in the neighborhood of 1600° F. sharply reduce surface area and activity. It is also apparent that there is some effect of temperature at 1400° F. and that surface area decreases as the time of exposure at the higher temperatures is extended.

I have found that, when a commercial pilled molybdena-on-alumina catalyst is removed from the hydroforming reactor, the contact mass contains pills of unequal catalyst activity. The majority of the pills are above 80 square meters per gram in surface area and have a reuseable life of 8 or 9 months. A small portion of the pills, which may have been subjected to overheating and in which the gamma alumina apparently has been converted substantially to alpha alumina, have a surface area of below 40 square meters per gram and are not fit for reuse. Since most of the particles are still of the original size, size separating techniques will not allow sufficient recovery of the good catalyst for reuse, permitting removal only of dust and broken pills, which, however, have low surface area and are, therefore, undesirable.

I find it possible to separate the relatively active from the relatively inactive catalyst particles by separating the total contact mass into two fractions of different "particle density" or "bulk density." The fraction of higher particle density is catalytically more active and is suitable for further use in the reaction.

In Table II below are given the surface area, the average catalytic activity, expressed as percent of the fresh catalyst, and the predicted catalyst life before segregating active from inactive particles, for a pilled fresh molybdena-on-alumina hydroforming catalyst; a similar catalyst after 11 months' commercial use; the portion of catalyst obtained by processing such spent catalyst according to my invention and recovering the portion of relatively high bulk density; and the material rejected as inactive catalyst, having relatively low bulk density.

*Table II*

| Property | Fresh Catalyst | After 11 Months' Use | Products From Processing | Rejects From Processing |
|---|---|---|---|---|
| Surface Area, Sq. m./Gram | 120 | 70 | 84 | 55 |
| Average Catalytic Activity, percent of Fresh Catalyst | 100 | 95 | 100 | 90 |
| Predicted Catalyst Life Before Reworking, Mo | 11 | 0 | 8 | 0 |

Figure 3:
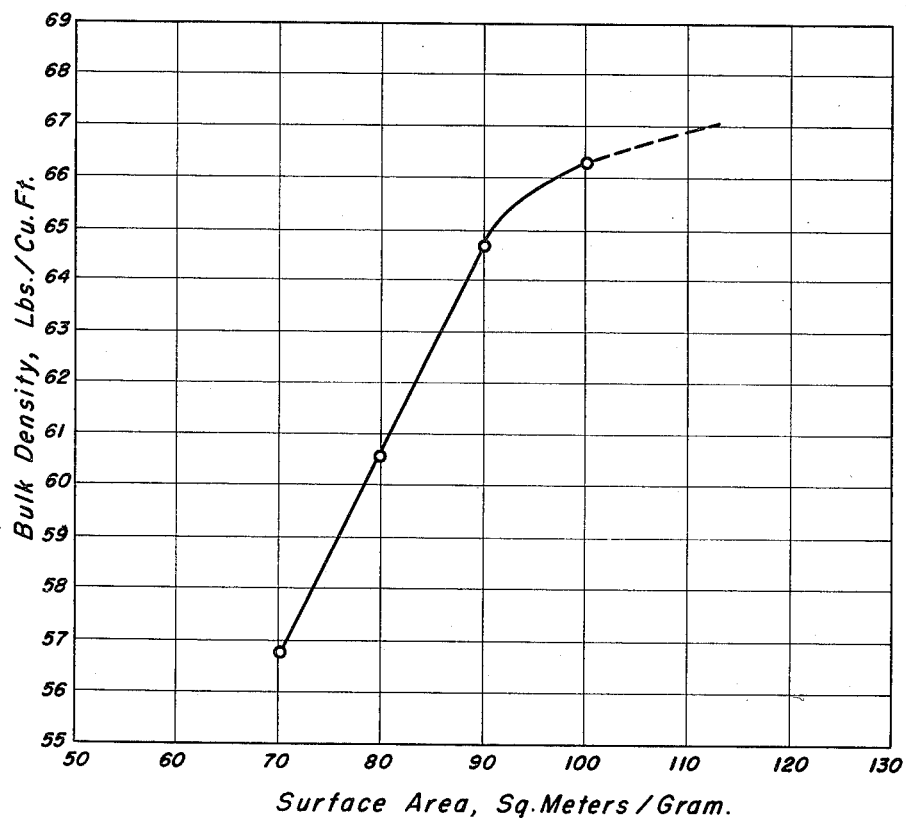
Fig. 3 is a graph showing the variation of bulk density of molybdena-on-alumina hydroforming catalyst with changes in surface area due to aging under process conditions.

The bulk densities of these particular catalysts were not measured. The bulk density of a similar catalyst was, however, correlated against the average surface area of such a catalyst in Fig. 3. It will be seen that there is a very drastic decrease in bulk density for catalyst having average surface area of less than 90 square meters per gram, and this substantial change in bulk density permits a simple separation of the active from the inactive particles by a dry density classifying means.

The present invention is not limited to the hydroforming of naphthenic naphtha, but is equally suitable for other conversions of organic reagents by contact with catalysts originally containing gamma alumina, no more than about 5% silica, and no more than 25% of catalytic metal, metal oxide, or metal salt. For example, the invention may be applied in the aromatization of paraffinic hydrocarbons or naphthas over a chromia on gamma alumina catalyst; in the hydrogenation of olefinic hydrocarbons or naphthas over a catalyst of cobalt molybdate or mixed oxides of cobalt and molybdenum on a gamma alumina base; in the hydrogenative desulfurization of petroleum fractions over catalysts such as cobalt molybdate on gamma alumina or molybdenum oxide on gamma alumina; in the vapor phase desulfurization of petroleum fractions over gamma alumina alone; and in other reactions.

The hydrocarbon fractions employed in the processes referred to above may originate from petroleum, coal, or synthesis or conversion processes. They may sometimes contain compounds of sulfur, nitrogen, oxygen, certain metals and the like, normally associated with such material.

Although the present invention is particularly adapted for use in processes employing fixed catalyst beds, and especially regenerative processes employing fixed beds, with pilled or lump catalyst, the invention may also be suitably employed in so-called moving catalyst bed operations employing a pilled or lump catalyst, or in so-called fluidized catalyst operations in which the catalyst particles are finely divided particles, usually no larger than 200 microns in diameter, which are suspended in a stream of reacting compounds in the reactor and in a stream of regenerating gas in a separate regenerator. In operating according to the present invention in such a fluidized or moving bed operation, the total contact mass may be reworked after an extended period of operation, or a portion of the circulating catalyst stream may be continuously or intermittently diverted to a separate device in which fractions of catalyst of differing density are obtained, and the higher density fraction returned to the circulating catalyst stream, the lower density fraction being discarded for reworking. Such equipment is known to the art and need not be described in detail.

I claim:

1. In the hydroforming of a naphthenic feed stock in a reactor with a fixed bed of pilled catalyst consisting essentially of gamma alumina, from about 5 to 15 weight percent, based on the gamma alumina, of molybdena, and not more than about 5 weight percent, based on the gamma alumina, of silica, said pills being of substantially uniform size in the range from about 1/8 to 1/2 inch in diameter, said catalyst having an average bulk density of at least about 65 pounds per cubic foot and a surface area of at least about 90 m.$^2$/gm., the improved method of operation which comprises hydroforming said feed stock until the average bulk density of said bed is less than about 60 pounds per cubic foot, discontinuing said hydroforming operation, withdrawing said bed of pilled catalyst from said reactor, segregating said bed of catalyst into an active fraction of catalyst particles having a bulk density of at least about 60 pounds per cubic foot and a discard fraction of catalyst particles of lesser bulk density, returning said active fraction to said reactor together with an amount of fresh particles equivalent to the amount of catalyst discarded and then resuming said hydroforming reaction.

2. A method as in claim 1 wherein said hydroforming reaction is initially conducted until the average bulk density of said bed of catalyst is less than about 57 pounds per cubic foot.

References Cited in the file of this patent

UNITED STATES PATENTS

| | | |
|---|---|---|
| 2,206,337 | Steele | July 2, 1940 |
| 2,437,532 | Huffman | Mar. 9, 1948 |
| 2,547,380 | Fleck | Apr. 3, 1951 |
| 2,567,207 | Hoge | Sept. 11, 1951 |
| 2,592,765 | Thomas | Apr. 15, 1952 |
| 2,635,749 | Cropper et al. | Apr. 21, 1953 |

OTHER REFERENCES

Webb et al.: "Petroleum Processing," November 1947, pp. 834–843.

Stumpf: "Ind. and Eng. Chemistry," vol. 42, No. 7 (1950), pp. 1398–1403.